(12) United States Patent
Valliere et al.

(10) Patent No.: US 9,930,960 B2
(45) Date of Patent: Apr. 3, 2018

(54) RACK COMPONENT AND RACK SYSTEM

(71) Applicants: Marc Denis Valliere, Jupiter, FL (US); Matthew David Burns, Palm Beach, FL (US)

(72) Inventors: Marc Denis Valliere, Jupiter, FL (US); Matthew David Burns, Palm Beach, FL (US)

(73) Assignee: VURN INNOVATION LLC, Jupiter, FL (US)

( * ) Notice: Subject to any disclaimer, the term of this patent is extended or adjusted under 35 U.S.C. 154(b) by 0 days.

(21) Appl. No.: 14/957,368

(22) Filed: Dec. 2, 2015

(65) Prior Publication Data

US 2016/0157604 A1  Jun. 9, 2016

Related U.S. Application Data

(60) Provisional application No. 62/086,738, filed on Dec. 3, 2014.

(51) Int. Cl.
*A47B 47/04* (2006.01)
*B65C 1/02* (2006.01)

(52) U.S. Cl.
CPC ............ *A47B 47/04* (2013.01); *A47B 47/047* (2013.01); *B65C 1/02* (2013.01)

(58) Field of Classification Search
CPC ..... A47B 47/0091; A47B 47/04; A47B 47/02; A47B 47/047; A47B 45/00; A47B 87/0276; B65G 1/02
USPC ................................. 211/41.15, 183; D25/68
See application file for complete search history.

(56) References Cited

U.S. PATENT DOCUMENTS

| | | | | |
|---|---|---|---|---|
| 5,072,901 A * | 12/1991 | Scott | .......................... | F16L 1/06 248/49 |
| 5,085,397 A * | 2/1992 | Henkel | .................. | F16M 13/00 182/178.1 |
| 5,178,279 A * | 1/1993 | Carroll | ................. | B65D 5/5088 206/335 |
| 5,729,949 A * | 3/1998 | Hartzheim | .............. | E04C 5/206 211/59.2 |
| 5,915,570 A * | 6/1999 | Orsini | .................... | A47B 45/00 211/198 |
| 5,931,320 A * | 8/1999 | Gajda | .................... | A47B 81/00 211/1.3 |
| 6,076,780 A * | 6/2000 | Honnecke | ............... | F16L 3/137 248/59 |
| 6,086,172 A * | 7/2000 | Lee | ......................... | A47B 45/00 108/101 |
| 6,520,456 B1 * | 2/2003 | Neider | ....................... | F16L 3/01 248/49 |
| 6,729,089 B1 * | 5/2004 | Spragg | ................ | E04H 12/2238 248/346.03 |
| 6,925,771 B2 * | 8/2005 | Lee | ........................... | E04C 5/08 52/685 |

(Continued)

*Primary Examiner* — Stanton L Krycinski
(74) *Attorney, Agent, or Firm* — Florek & Endres PLLC

(57) ABSTRACT

A rack component having a component body with a front, back, top, base, width between the front and the back, and an aperture extending through the component body near the top, the top of the component body configured to be the negative of a cut-out on the base, such that the cut-out on the base of one component body can receive the configuration on the top of an adjacent component body below it. A rack system using a series of the rack components is also disclosed.

16 Claims, 7 Drawing Sheets

(56) References Cited

U.S. PATENT DOCUMENTS

| | | | | |
|---|---|---|---|---|
| 7,007,978 B1 * | 3/2006 | Purdom | ............... | A63C 19/00 |
| | | | | 248/49 |
| D521,851 S * | 5/2006 | Smart | ............... | D8/354 |
| 7,278,613 B2 * | 10/2007 | Roy | ............... | F16L 3/02 |
| | | | | 138/106 |
| 7,441,731 B2 * | 10/2008 | Smart | ............... | F16L 3/02 |
| | | | | 248/68.1 |
| D585,728 S * | 2/2009 | Bertoni | ............... | D8/358 |
| 8,347,811 B2 * | 1/2013 | Bucci | ............... | B05B 13/02 |
| | | | | 118/500 |
| 8,371,456 B2 * | 2/2013 | Scadden | ............... | F26B 9/10 |
| | | | | 211/59.4 |
| 8,807,492 B2 * | 8/2014 | Lake | ............... | F16L 3/222 |
| | | | | 248/65 |
| 2003/0089829 A1 * | 5/2003 | Brandzel | ............... | F16L 3/222 |
| | | | | 248/68.1 |

* cited by examiner

RACK COMPONENT AND RACK SYSTEM

FIELD OF THE INVENTION

The present invention relates to a rack component and, more particularly, to a rack component that can be used with similar rack components for stacking doors, moldings and related materials during the finishing process.

BACKGROUND OF THE INVENTION

Workers finishing building workpieces such as doors, trim, moldings and the like during building or renovations, including painting, staining, sealing, or the like, often experience difficulties due to the awkward shapes and need to finish more than one side of the piece or pieces. For example, when finishing a door, a worker generally needs to paint a first side, wait for that side to dry and then finish the other side. Moreover, because of the size of most doors, finishing multiple doors often requires significant space to lay the doors down with the finish side up so that the finish side does not come in contact with other pieces, tools, brushes, drop cloths, etc., during the drying process.

Devices used to finish and stack workpieces have been primarily limited to saw horses, work benches, boards and the like, which are themselves not only space consuming when in use, but also space consuming when not in use and need to be stored.

Efforts to permit drying in smaller spaces generally include trying to place workpieces such as doors on an edge and stacking subsequent doors horizontally. However, this still requires that the edges be unfinished, and can lead to imperfections in the finish where a piece rests against an adjacent piece. Similarly, when drying trim or moldings, it is usual to finish a piece and then line it up with similarly finished pieces on a flat surface such as a floor or leaning against a wall to maximize space when drying. However, this quickly leads to the use of all available floor or wall space, leaving the worker without sufficient room.

Therefore, there is a failure in the art to provide a solution for permitting a user to finish doors, trim, molding and other pieces quickly and efficiently, and minimizing the space needed to dry multiple pieces as they are finished.

SUMMARY OF THE INVENTION

The present invention is directed to a rack component and rack system comprising a component body having a front, a back, a top, a base, a width between the front and the back, and an aperture near the top extending through the component body, wherein the top of the component body comprises a configuration that is the negative of a configuration cut-out on the base of the component body, such that the configuration cut-out on the base of one component body can receive the configuration on the top of an adjacent component body.

In the most preferred embodiment, the component body is generally in the shape of triangle with first and second sides of substantially equal length converging upwardly to an upper angle, a third side of an equal or different length than the first and second sides, the third side having a cut-out corresponding substantially to the upper angle, where the aperture is within the upper angle and extends through the component body.

The aperture is preferably in the shape of a circle for receiving a fastener such as a nail, screw or the like that passes through the aperture and can be affixed to the edge of a workpiece. Most preferably, the diameter of the aperture in the component body is preferably larger than the diameter of the fastener used with the component body, so that the component body can move freely about the fastener.

When finishing a door the worker preferably attaches two rack components to the top and bottom edges of a door, with at least two rack components on one of the top and bottom edges of the door and at least one rack component on the other of the top and bottom edges of the door. This permits the door to be suspended above a support surface, supported by the rack components fastened to the top and bottom edges of the door. When one side of the door is finished, workers can grasp the rack components at one side of each of the top and bottom, lifting the rack component(s) off of the support surface while maintaining the other of the rack components standing on the support surface. The door can then pivot on the fastener through the aperture on the standing rack component, flipping the door so that the second side is facing upwardly and the previously finished, but not yet dry side is facing downwardly. In doing so, the rack components both pivot around the fastener through the apertures so that the bottom or third sides of the rack components are maintained as the base to support the door.

The cut-out on the bottom of the component body is shaped substantially the same as the configuration of the top of the component body. In the triangle shape of the preferred embodiment, the upper angle is received in a cut-out on the bottom of the component body for receiving the upper angle of a rack component placed beneath. This allows rack components affixed to multiple workpieces to be stacked upon one another for finishing multiple workpieces.

For example, when finishing multiple doors, each of the doors would have rack components on the top and bottom edges at substantially the same points along the length of the top and bottom edges of the doors. When both sides of a subsequent door has been finished, the subsequent door can be lifted by the rack components, so as not to touch the newly finished door, and stacked on the rack components fastened to the previously finished door. This permits the finished doors to be stacked vertically in a minimal amount of space for drying until all are completely dried.

The width of the rack component is preferably sufficient to permit the rack components to stand and provide sufficient integrity to support the workpiece and to ensure a good support surface when adjacent rack components are stacked. Not only should the width be sufficient to support a heavy object such as a door, it should be sufficient to maintain the rack components in an upright position when supporting lighter loads such as trim or moldings.

For example, the rack components can be used with a span, such as a board, between opposed rack components to form a "bridge." When two or more of such bridges are placed at a sufficient distance from one another, trim, moldings, and the like can be finished and placed on the span in rows for drying. Moreover, multiple bridges of pairs of rack components with spans therebetween can be formed and stacked upon one another so that layers of workpieces can dry simultaneously.

In a preferred embodiment, the first and second sides of the component body may further include supports at a lower portion of the sides for receiving workpieces to dry. More specifically, supports may extend at an angle substantially perpendicular to or extending upwardly from the first and second sides to provide a rest against which a piece of trim, molding or the like may be supported. In the preferred embodiment, the extension of the supports and the length of the first and second sides is sufficient to hold a 6" wide piece of trim, molding or the like while also supporting a door, making multiple uses of the component body.

Although the component body can be solid across its width, it may be formed in an I-beam construction, with the edges having the full width and the middle having a reduced thickness to conserve material. Notwithstanding, it is preferred that an area surrounding the aperture extend to at least the width of one side of the component body, and preferably extend beyond the width of the component body to minimize contact with the door when the door and component body are being pivoted about the fastener. It is most preferred that the opposed side of the aperture be recessed from the width, and preferably recessed a sufficient distance so that the recess can retain and support a dowel spanning two rack components, for hanging workpieces if desired.

The component body may be made of any suitable material that can provide structural integrity to the workpiece or stacked workpieces being supported, including wood, metal, plastic or the like, as well as combinations thereof. Most preferably, the component body is formed of an integrally formed plastic material by injection molding, to reduce the costs.

BRIEF DESCRIPTION OF THE DRAWINGS

The attached drawings, in which like reference characters represent like parts, are intended to better illustrate a preferred embodiment of the present invention without limiting the invention in any manner whatsoever.

DETAILED DESCRIPTION OF THE PREFERRED EMBODIMENT

Figure 1:
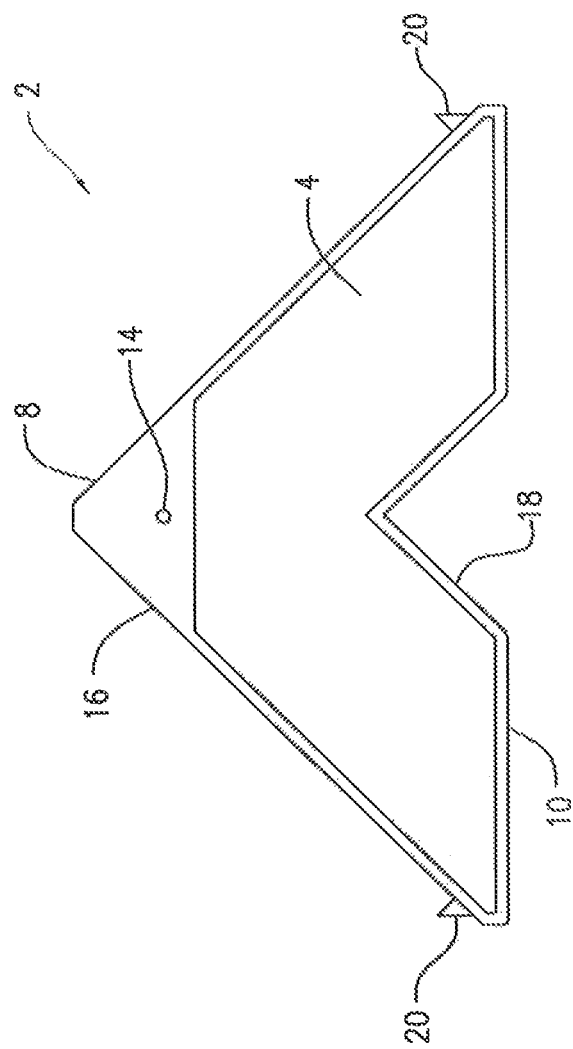
FIG. 1 is a front elevation of an embodiment of the present invention.

The following description of the preferred embodiment is presented to describe the present invention without limiting the scope of the appended claims in any manner whatsoever.

As shown in FIGS. 1-5, the present claimed invention is directed to a rack component, used as part of a rack system, where the rack component comprises a component body 2 having a front 4, a back 6, a top 8, a base 10, a width 12 between the front 4 and the back 6, and an aperture 14 near the top extending through the component body 2, wherein the top 8 of the component body comprises a top configuration 16 that is the negative of a bottom configuration 18 on the base 10 of the component body 2, such that the bottom configuration 18 on the base 10 of one component body 2 can receive the top configuration 16 on the top 8 of an adjacent component body 2.

In the most preferred embodiment, the component body 2 is generally in the shape of triangle with first and second sides of substantially equal length converging upwardly to an upper angle at the top 8, a third side of an equal or different length than the first and second sides forming the base 10, the third side having a cut-out configuration 18 corresponding substantially to the configuration 16 of the upper angle at the top 8, where the aperture 14 is within the upper angle and extends through the component body 2.

The aperture 14 can be any shape but is preferably a circular cylinder for receiving a fastener such as a nail, screw or the like, that passes through the aperture and can be affixed to the edge of a workpiece. In the preferred system, the fastener is a screw to provide ease of attachment and removal from the workpiece. Most preferably, the diameter of the aperture 14 in the component body 2 is somewhat larger than the diameter of the fastener passing through the aperture 14, so that the component body 2 can rotate about the fastener.

When finishing a door the worker preferably attaches two rack components 2 to the top and bottom edges of the door. Although the components 2 can be arranged with at least two rack components 2 on one of the top and bottom edges of the door and at least one rack component 2 on the other of the top and bottom edges of the door, it is preferred that four rack components 2 be used, with two components 2 fastened to the top edge and two components 2 fastened to the bottom edge of the door. Once the rack components 2 are attached, the door can be placed horizontally and easily finished and flipped to finish the opposite side.

The cut-out bottom configuration 18 on the base 10 of the component 2 is shaped substantially the same as the configuration 16 of the top 8 of the component 2 so that the bottom configuration 18 of one component 2 securely nests on the configuration 16 at the top 8 of a component 2 below it. In the triangle shape of the preferred embodiment, the upper angle top configuration 16 is received in a triangular cut-out bottom configuration 18 on the base 10 of the component body 2 for receiving the upper angle of a rack component placed beneath.

The width 12 of the rack component 2 is preferably sufficient to permit the rack components 2 to stand and provide sufficient integrity to support the workpiece and to ensure a positive engagement surface when adjacent rack components 2 are stacked. Not only should the width 12 be sufficient to support a heavy object such as a door, it should be sufficient to maintain the rack components 2 in an upright position when supporting lighter loads such as trim or moldings.

Figure 2:
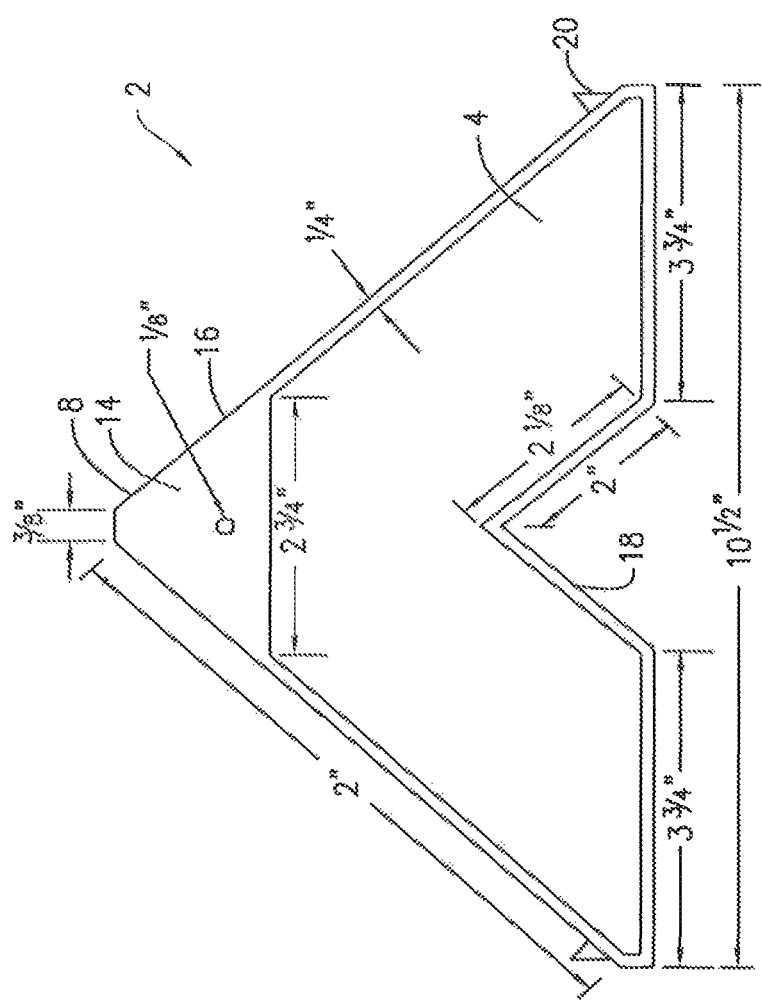
FIG. 2 is a front elevation of the embodiment of FIG. 1 with preferred dimensions illustrated.
Figure 3:
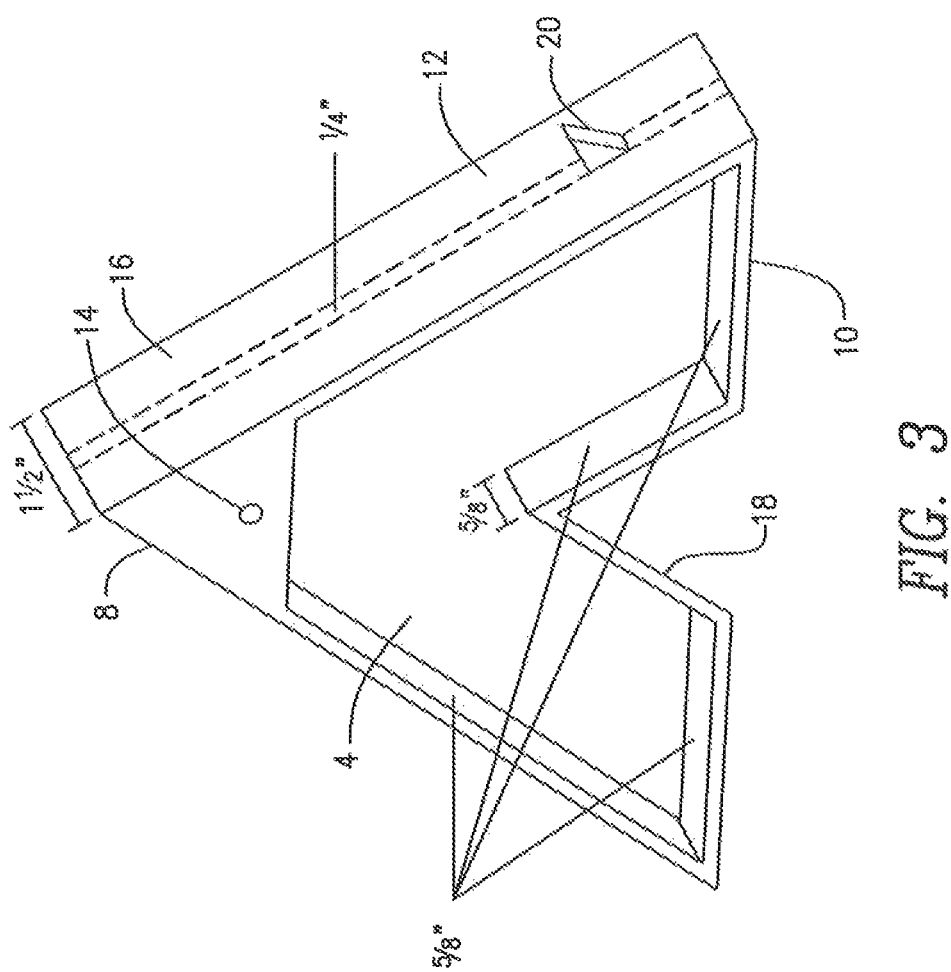
FIG. 3 is a front perspective view of the embodiment of FIG. 1 with preferred dimensions illustrated.
Figure 4:
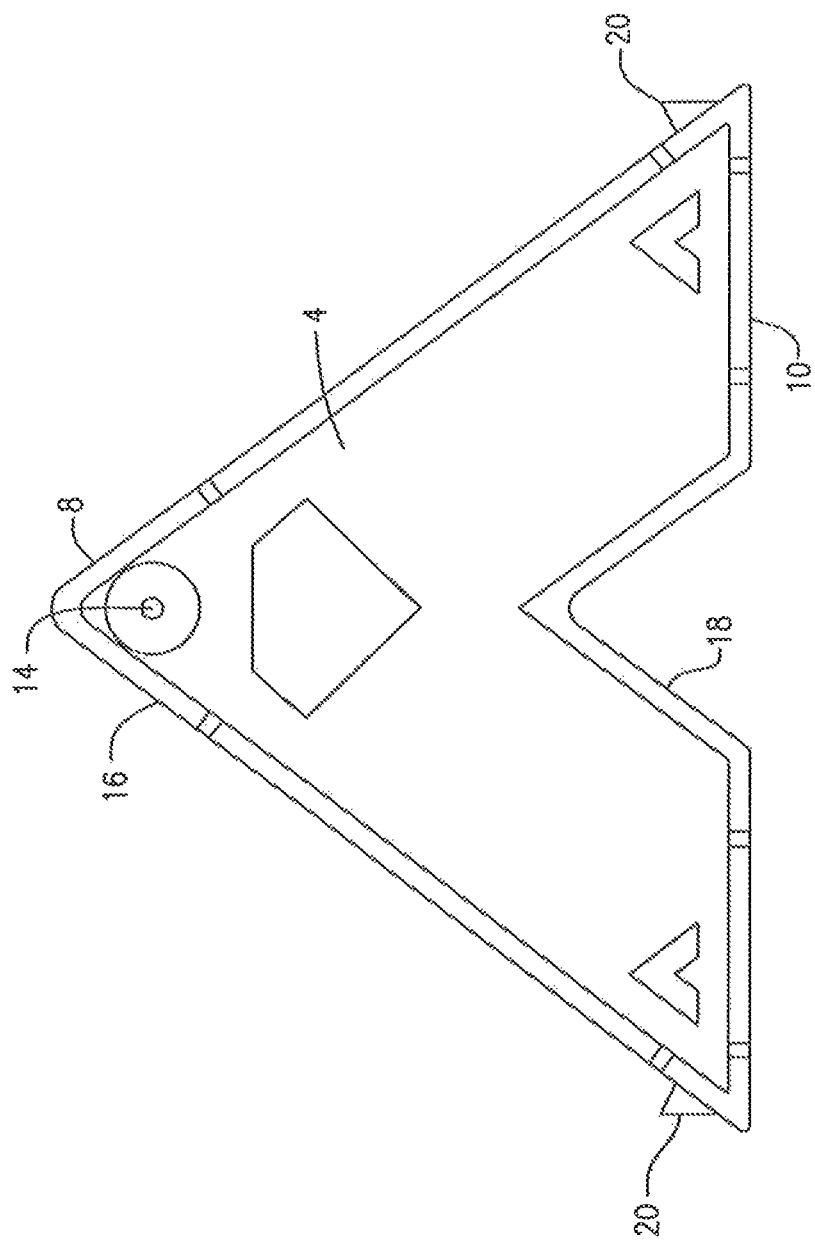
FIG. 4 is a front elevation of an alternative embodiment of the present invention.
Figure 5:
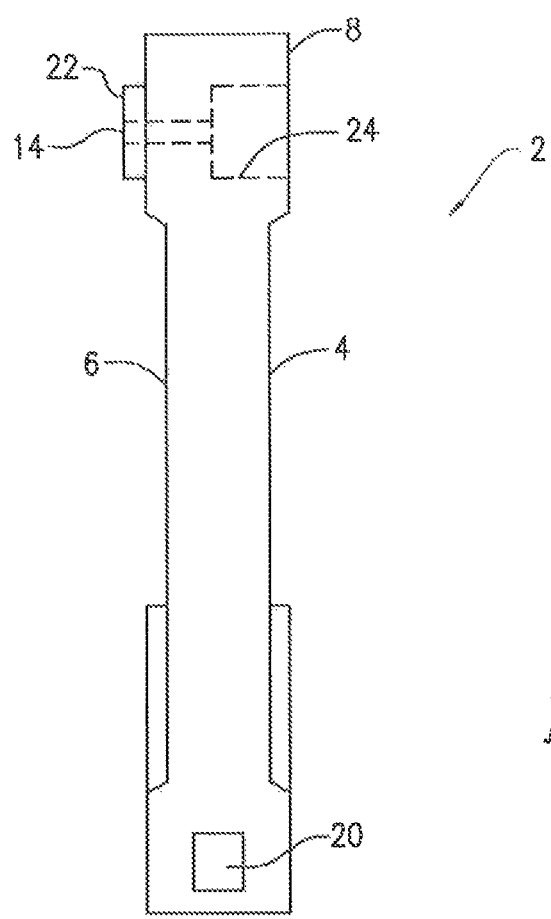
FIG. 5 is a side elevation of the alternative embodiment of FIG. 4.

Although the dimensions of the rack component 2 can be any dimensions suitable to support and stack workpieces, a triangular rack component 2 having upwardly facing converging sides of about 9 inches each and a base of about 10 inches across with a width of about 1½ inches is believed to be suitable (see FIGS. 2 and 3). The component 2 with these dimensions would preferably have a cut-out bottom configuration 18 with side walls of about 2 inches each and an angle that matches the configuration 16 at the top 8 of the component 2. Additionally, the aperture 14 would preferably be about ⅛ to ¼ inch in diameter for the fastener to freely pass through.

Of course, side dimensions of about 4 to 18 inches, bases of about 5 to 24 inches and widths of about ½ to 12 inches could be used for the embodiment shown, with an aperture of about 1/16 to 1 inch and a bump-out and recess of about 1/2 to 3 inches, without limitation.

In the preferred embodiment shown in the drawings attached hereto, the outer side walls of the component body 2 include supports 20 near the base 10 for supporting workpieces. More specifically, supports 20 may extend at an angle substantially perpendicular to or extending upwardly from the sides to provide a rest against which a piece of trim, molding or the like may be supported.

The preferred embodiment of the component body 2 shown is formed in an I-beam construction, with the edges having the full width 12 and the middle having a reduced thickness to conserve material. Although any suitable thicknesses can be used, the preferred embodiment shown contemplates the middle portion being about 1/4 inch thick, with edges of about 5/8 inch on each side to form the 1 1/2 inch width 12.

In any event, it is preferred that an area surrounding the aperture 14 extend to at least the width 12 of one side of the component body 2. Most preferably, the component body 2 comprises a bump-out 22 on one side of the front 4 or back 6 which is to be adjacent the workpiece, to keep the remainder of the component body 2 spaced away from the workpiece and reduce risk of marking the finish (see FIG. 5).

It is also preferred that the area surrounding the side of the aperture 14 opposite the bump-out 22 be formed as a recess 24 from the width 12. The recess 24 is preferably sized not only to accept the head of the fastener but, in the most preferred embodiment, to provide a receptacle to retain and support a dowel. This permits the use of a dowel as a span between two components 2 with the recesses 24 facing one another, which can be fastened with a fastener passing from the bump-out 22 to the dowel in the recess 24, on which workpieces can be hung if desired.

The component body may be made of any suitable material that can provide structural integrity to the workpiece or stacked workpieces being supported, including wood, metal, plastic or the like, as well as combinations thereof. Most preferably, the component body is formed of an integrally formed plastic material by injection molding. Moreover, as described above, the middle of the component body 2, as well as areas through the component 2 and along the width 12, can be reduced and/or removed to further reduce the amount of material without reducing structural integrity.

Figure 6:
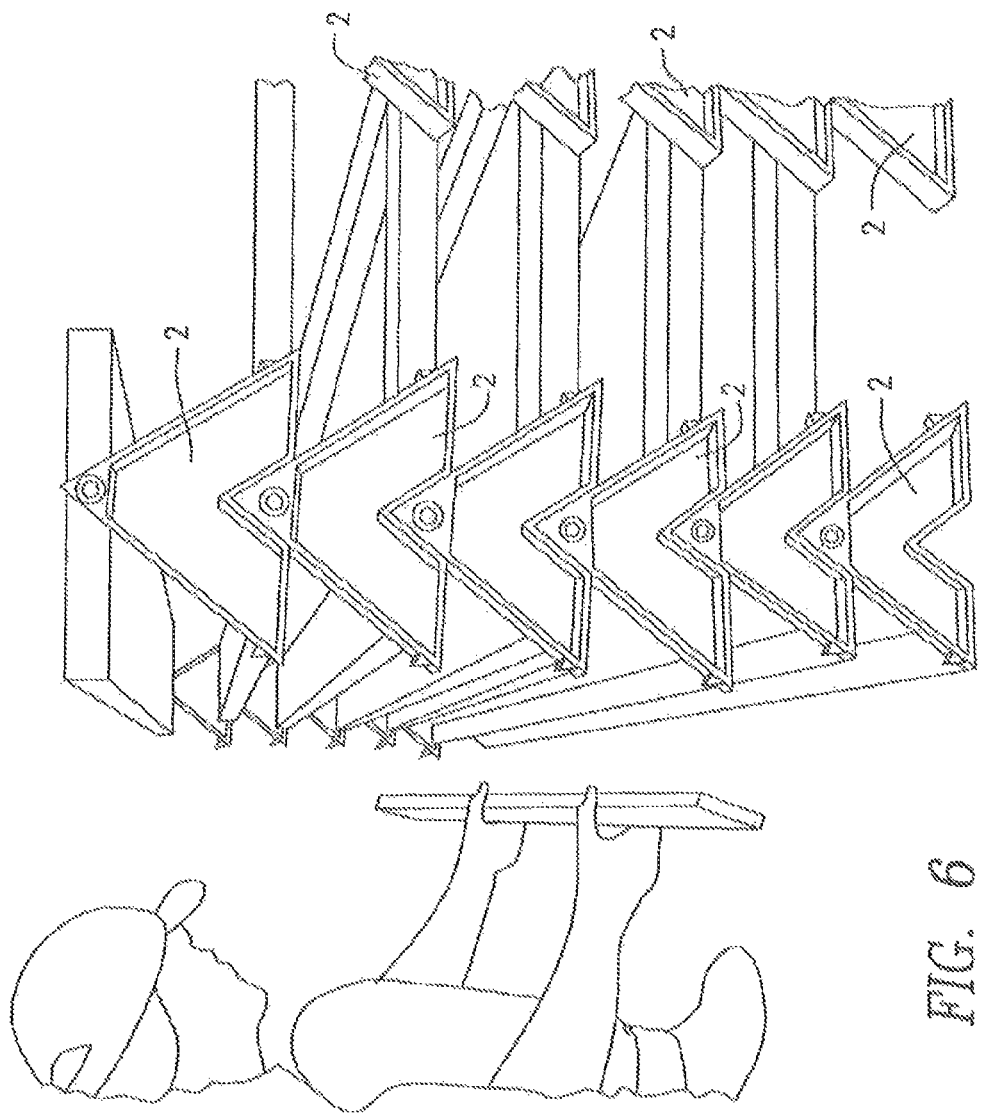
FIG. 6 is a perspective illustration of a rack system made of the rack components of the present invention holding a series of doors and trim or molding workpieces.

A rack system can be created using the rack component 2. As described above, the system may comprise four rack components 2 with a fastener for each component 2 to fasten the components to the top and bottom edges of a door. Using four more rack components 2 with fasteners for each additional door, a series of doors with rack components 2 fastened in substantially the same location can be stacked as shown in FIG. 6. Additionally, trim, moldings or the like can be placed on the supports 20 of the successive components 2, as further shown in FIG. 6.

Figure 7:
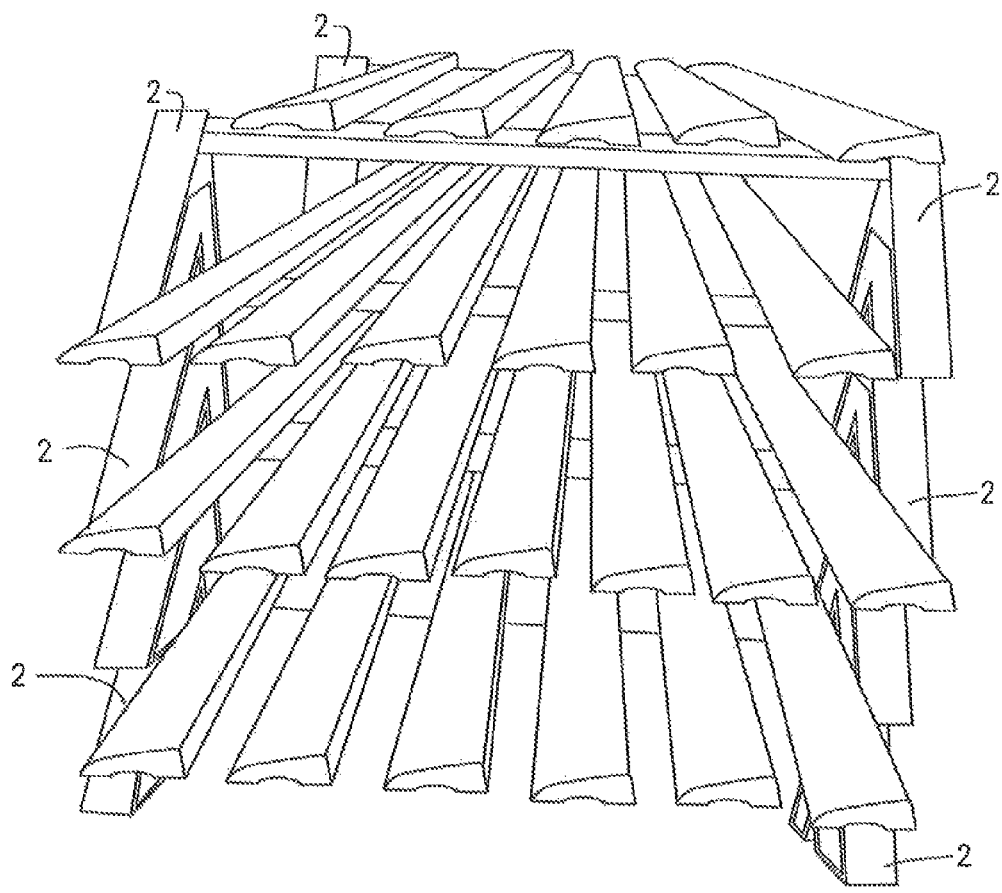
FIG. 7 is a perspective illustration of a rack system made of the rack components of the present invention with a span holding multiple trim or molding workpieces on a number of levels.

Similarly, fastening connecting spans between rack components 2 to form bridges, and using two or more bridges of two components 2 with a span fastened between them to a level, a series of levels can be formed to hold finished trim, moldings or the like on successive levels. As shown in FIG. 7, this system maximizes space for drying many pieces of trim, molding or the like in a minimum amount of space.

Variations, modifications and alterations to the above detailed description will be apparent to those skilled in the art. For example, the weight element may be in the form of three weighted rods with three adjacent pockets just in from terminal edge of the fold over panel. All such variations, modifications and/or alternatives are intended to fall within the scope of the present invention, limited only by the claims. Any cited patents and/or publications are incorporated by reference.

We claim:

1. A rack component comprising a component body integrally formed of a single material having a front, a back, a top, a base, a width between the front and the back, opposed side walls, and an aperture extending through the component body near the top, said side walls converging from the base to the top, at least one of the side walls comprising an outwardly extending support including a support surface extending outwardly at an angle of about 90° or upwardly from a portion of the at least one side wall above the support surface, wherein the support surface is adapted to rest a workpiece upon the support and against the at least one side wall, wherein the top of the component body comprises a configuration that is the negative of a configuration cut-out on the base of the component body, such that the configuration cut-out on the base of the component body can receive a configuration on the top of another adjacent said rack component body oriented below the rack component.

2. The rack component of claim 1 wherein the component body is in the shape of a triangle with,
   first and second sides of said triangle being formed of said converging opposed side walls, with said first and second sides being substantially equal in length, with said first and second sides converging upwardly to an upper angle and a third side of said triangle being formed of said base with said third side being of an equal or different length than said first and second sides,
   where the configuration cut out on the base substantially corresponds to the upper angle and the aperture is within the upper angle.

3. The rack component of claim 1 wherein the component body is formed of an I-beam cross section.

4. The rack component of claim 1 wherein the component body further comprises a bump-out on at least one of the front and the back of the component body about the aperture.

5. The rack component of claim 2 wherein the component body is formed of an I-beam cross section.

6. The rack component of claim 2 wherein the component body further comprises a bump-out on at least one of the front and the back about the aperture.

7. The rack component of claim 2 wherein the support for resting a workpiece is on at least one of the first and second sides.

8. The rack component of claim 1 wherein the component body is formed from a material taken from the group consisting of metal, wood and plastic.

9. A rack system comprising a series of stacked rack components forming a series of levels, each rack component comprising a component body integrally formed of a single material having a front, a back, a top, a base, a width between the front and the back, opposed side walls, and an aperture extending through the component body near the top, said side walls converging from the base to the top, at least one of the side walls comprising an outwardly extending support including a support surface extending outwardly at an angle of about 90° or upwardly from a portion of the at least one side wall above the support surface, wherein the support surface is adapted to rest a workpiece upon the support and against the at least one side wall wherein the top of the component body comprises a configuration that is received in a configuration cut-out on the base of the component body of an adjacent one of the rack components oriented above the component body, the system further comprising a fastener for fastening each rack component to a workpiece.

10. The rack system of claim 9 comprising four of the rack components for each level.

11. The rack component of claim 1 further comprising an outwardly extending support on the other of the at least one side walls.

12. The rack component of claim 1 wherein the support surface extends substantially perpendicular to the portion of the side wall above the support surface.

13. The rack component of claim 1 wherein the opposed side walls converge inwardly for at least a portion of a distance between the base and the top in an area above the outwardly extending support.

14. The rack component of claim 9 wherein the support surface extends substantially perpendicular to the portion of the side wall above the support surface.

15. The rack component of claim 9 further comprising an outwardly extending support including a support surface on the other of the at least one side walls.

16. The rack component of claim 9 wherein the opposed side walls converge inwardly for at least a portion of a distance between the base and the top in an area above the outwardly extending support.

\* \* \* \* \*